RECORD PLAYER

Filed Nov. 8, 1957 2 Sheets-Sheet 1

INVENTOR:
EDWIN S. BARA

BY Watson D. Harbaugh
ATT'Y

RECORD PLAYER

Filed Nov. 8, 1957 2 Sheets-Sheet 2

INVENTOR:
EDWIN S. BARA
BY Watson D. Harbaugh
ATT'Y

United States Patent Office 2,963,297
Patented Dec. 6, 1960

2,963,297

RECORD PLAYER

Edwin S. Bara, Chicago, Ill., assignor to Webcor, Inc., Chicago, Ill., a corporation of Illinois Filed Nov. 8, 1957, Ser. No. 695,268

12 Claims. (Cl. 274—10)

Figures 1, 2, 3, 8:
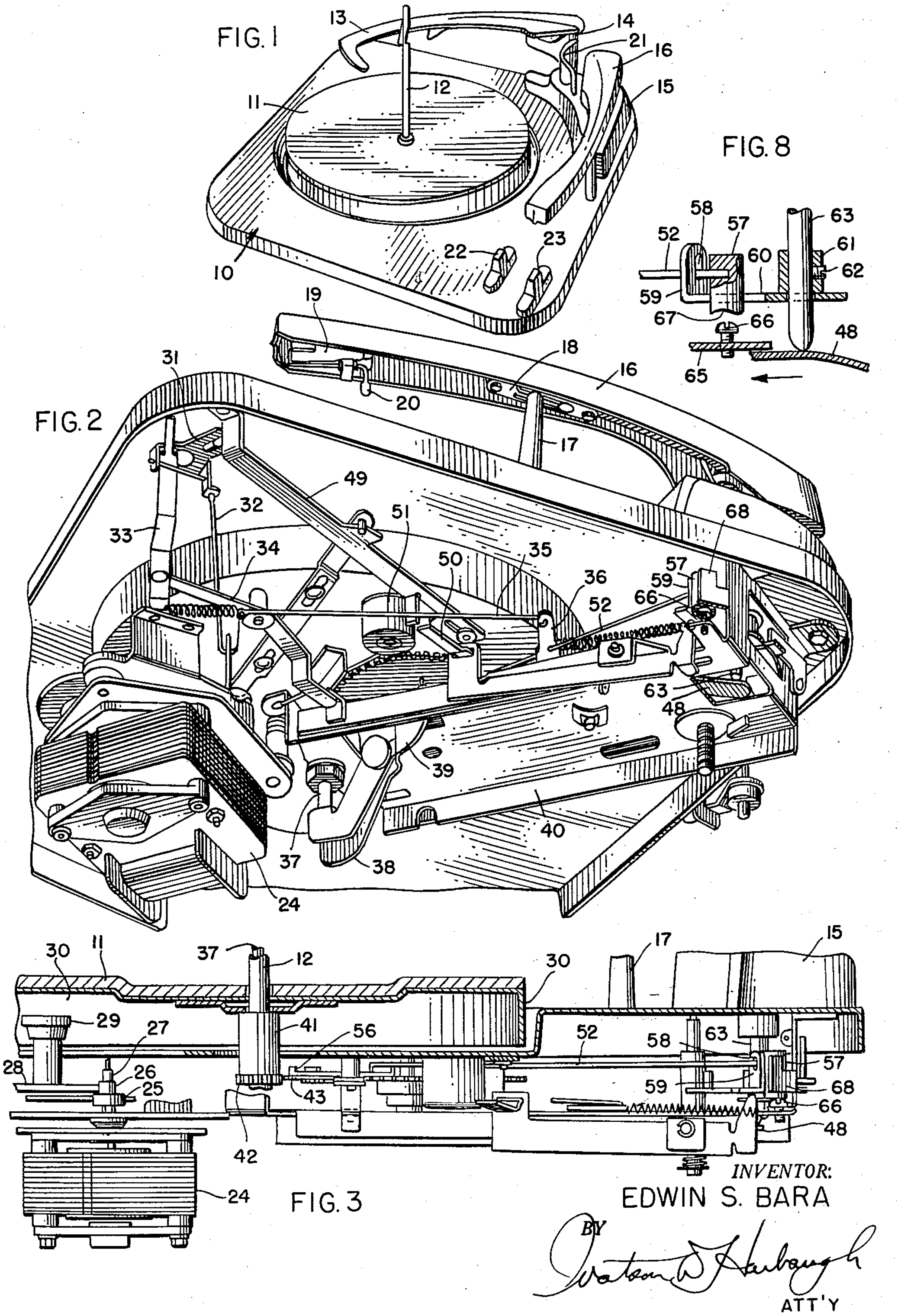

This invention relates to a record player, and more particularly to a record player that may be selectively conditioned for manual control of the reproduction cycle or automatic control thereof, wherein a plurality of records are played successively without the attention of an operator.

This application is a continuation-in-part of my co-pending application, Serial No. 669,806, filed July 3, 1957.

Record players of the general type herein considered are old and well known in the art. That is to say, it is not novel per se at this stage in the development of the art to provide a record player that can be made to operate selectively under manual or automatic control. However, all known record players require the manipulation of various controls to condition the apparatus for either manual or automatic operation. Thus, the record players now in use have a manually manipulatable control which must be shifted to the "manual" position or to the "automatic" position when a change from one type of operation to the other is required. In addition, these same record players have a reject control that permits the operator to recycle the apparatus before a record has been played to completion, if desired.

An object of the present invention is to provide a record player capable of either manual or automatic operation, but which does not require additional or separate controls to accomplish a shift from one type of use to another. Another object of the invention is to provide a record player of the character described, in which a shift can be made from automatic to manual operation through the tone arm assembly simply by manually moving the tone arm from its rest position into engagement with a record tablet, or by returning it to its rest position any time during automatic operation.

Still another object is that of providing a record player of the type described, wherein the control thereof remains manual until the record reject control is manipulated, whereupon the automatic recycling sequence is maintained until all of the records on the storage spindle have been played, or until the tone arm is again manipulated to return the apparatus to manual control. Yet a further object of the invention is to provide a record player that may be manually or automatically recycled, and wherein the type of operation is determined by the relative position of a weight and support bracket therefor.

Still a further object of this invention is in the provision of a phonograph having an automatically recycled record changer, and in which a recycling operation is initiated by a control rod that is held inoperative by the position of a weight when the phonograph is under manual control, and which is made operative by another position of the same weight when the phonograph is under automatic control. Still another object is in providing a record player equipped with a weight-actuated control rod of the character set forth, in which the position of the weight is determined by whether the tone arm is manually or automatically manipulated, and wherein the weight is always returned to the position thereof that renders the control rod inoperative upon manual manipulation of the tone arm.

Yet a further object is in the provision of a record player having the characteristics described, with the result that the control thereof by an operator is substantially simplified by eliminating the "manual-automatic" selection button, and wherein the construction of the apparatus is simplified and the cost reduced by eliminating such selection button and its associated mechanism. Additional objects and advantages of the invention will become apparent as the specification develops.

Embodiments of the invention are illustrated in the accompanying drawings, in which—

Figures 4, 5, 6, 7:
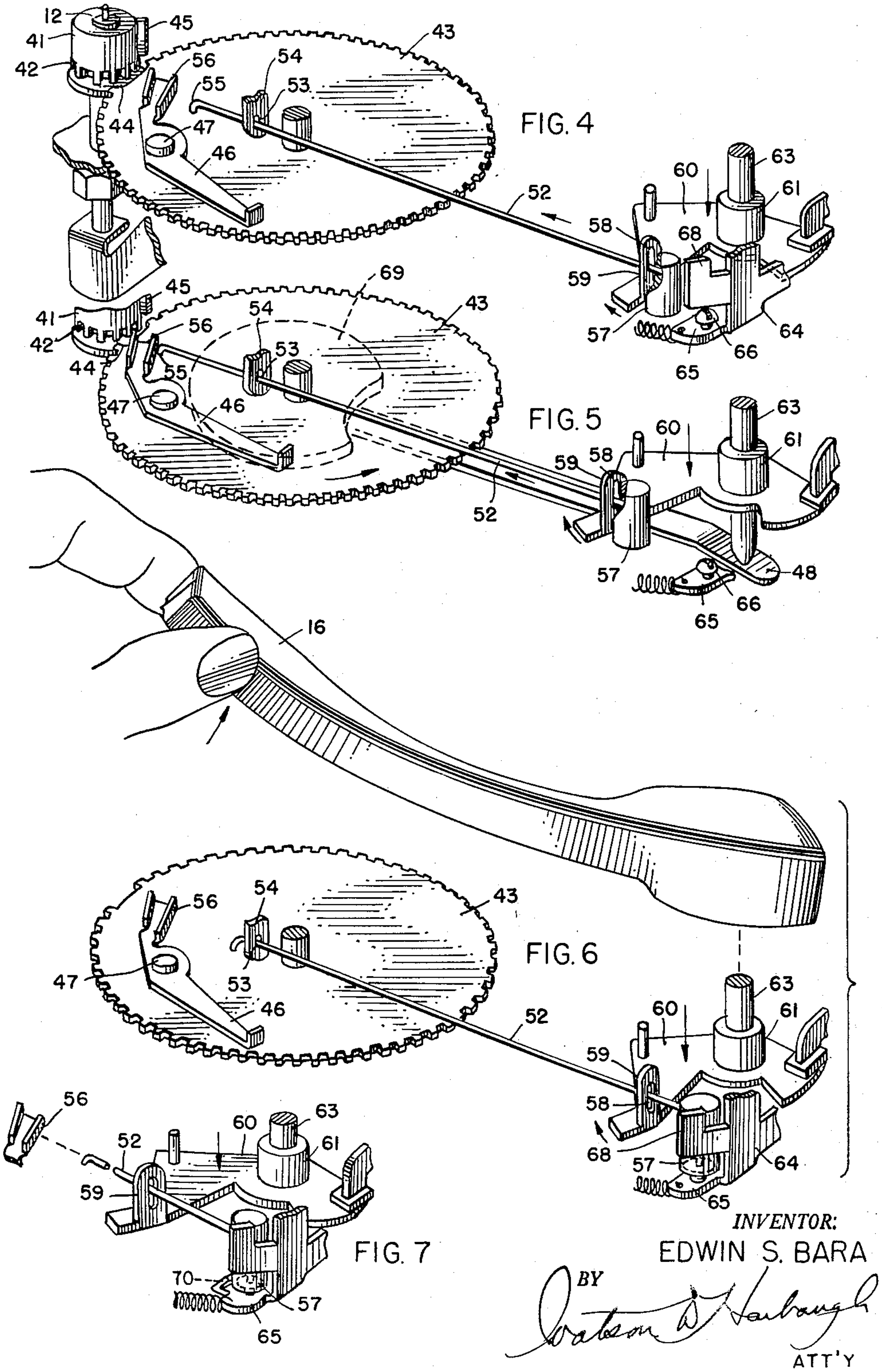

Figure 1 is a perspective view of a record player incorporating the invention; Figure 2 is also a perspective view of the same record player, but showing the underside thereof; Figure 3 is a broken, longitudinal sectional view taken just inside of the forward depending lip of the record player platform as viewed in Figure 2; Figure 4 is a broken perspective view of the component parts of the automatic recycling apparatus which are germane to the instant invention, and it shows the orientation of these components at the time of initiation of a record reproduction cycle; Figure 5 is a broken perspective view substantially identical to that of Figure 4, but showing the relative position of the component parts at the time that a record reproduction cycle is terminated; Figure 6 is a broken perspective view, again substantially similar to those of Figures 4 and 5, but showing the relative position of the component parts with the record player under manual control; Figure 7 is a broken perspective view, quite similar to views 4 through 6 but with less components illustrated, and showing the relative position of the components at the termination of a record reproduction cycle under manual control, and in which a slight modification of the mechanism is included; and Figure 8 is a broken side view in elevation of a portion of the tone arm assembly.

The record player or record changer illustrated in Figures 1 through 3 is to a great extent conventional, and is seen to comprise a platform 10 having a turntable 11 rotatably supported thereon. Extending upwardly through the turntable 11 is a spindle 12 adapted to receive record tablets thereon, and a holder or stabilizer arm 13 rotatably supported on the platform 10 through a standard 14 is adapted to cooperate with the spindle 12 in the storage of records thereon for successive discharge thereof onto the turntable 11. It will be apparent that the holder 13 may swing laterally of the position illustrated in Figure 1, to permit the removal of records from the spindle 12 and the placement of records thereon. Adjacent the standard 14 is a tone arm assembly designated in general with the numeral 15, and which comprises a tone arm 16 pivotally supported by the platform 10.

In Figures 1 and 2, the tone arm 16 is shown in its rest position, and in such position is supported by a post 17 that may have a reduced upper end portion equipped with a peripheral channel adapted to engage the spring latch 18 rigidly secured to the underside of the tone arm to anchor the tone arm to the post. At its upper end, the tone arm is equipped with the usual needle cartridge 19 that may be provided with a selector 20 for changing needles when records of different speeds are placed upon the turntable 11. Also, the record player may be provided with a flag or sensing device 21 operative to measure the diameter of each record dropped onto the turntable and, as is known, such sensing device is connected with the motor drive assembly to be described hereinafter, for changing the speed of the turntable in accordance with the dimensional requirements of each record played which, in turn, corresponds to the playing speeds thereof. Carried along the upper side of the platform 10 are a pair of manually adjustable controls 22 and 23, the first of which is adapted to change the playing speed of the turntable 11, and the second being a combination on/off and reject control.

Mounted on the underside of the platform 10 is a motor 24 having the shaft thereof equipped with a plurality of drive wheels 25, 26, and 27 that may be selectively shifted into engagement with a driven wheel 28 connected by a shaft to a turntable drive wheel 29 adapted to engage the depending rim 30 of the turntable 11. The drive wheels 25 through 27 are stepped so that the rate at which the turntable is rotated depends upon which of these wheels is in engagement with the driven wheel 28.

The driving relation between the wheels 25 through 27 and 28 is determined by the position of the selector button 22 which is arranged with a bracket 31 so as to pivot the same and thereby orient the drive and driven wheels through the link 32. The bracket 31, and consequently the selector 22, is also connected to the sensing device 21 through the control linkage 33, 34, 35 and 36 in a manner such that the proper rotational velocity for the turntable is automatically established for each record as such record drops from the storage portion of the spindle 12 toward the turntable 11. Since this mechanism as well as the motor drive assembly per se form no part of this invention, no further description thereof will be set forth.

The spindle 12, as shown in Figures 2 and 3, has an inner slidable rod 37 that extends downwardly through the turntable and platform, and into engagement at its lower end with a lever 38 that is pivoted upwardly by a cam 39 when the record player is automatically recycled, for the purpose of ejecting records from the storage section of the spindle so that they may drop downwardly toward the turntable 11. The lever 38 is pivotally carried by an inverted, generally U-shaped channel member 40 that extends in a generally diagonal direction along the underside of the platform 10 and is rigidly secured thereto.

Figure 3 makes it clear that the turntable 11 has a collar 41 rigidly secured thereto which is equipped at its lower end with a drive gear 42. The spindle 12 extends downwardly through the collar 41 and gear 42, and permits relative rotation therebetween so that the spindle remains stationary during operation of the apparatus. The driving gear 42 is adapted to mesh with a recycling gear 43 (Figure 4) throughout substantially the entire circumferential surface thereof. However, the recycling gear is provided with a recess 44 in a portion thereof which, when adjacent the drive gear 42, discontinues the driving relation therebetween. The collar 41 is equipped at one point thereon with an outwardly extending protuberance or abutment 45. Such abutment is adapted to engage (as shown in Figure 5) a recycling actuator 46 pivotally mounted on a pin 47 provided by the recycling gear 43 a spaced distance from both the center and circumference thereof.

Normally, the drive gear 42 and recycling gear 43 have the relationship shown in Figure 4 wherein the recess 44 is adjacent the drive gear, and as a result the recycling gear 43 does not rotate even though the turntable is rotating the drive gear. At this time, the recycling actuator 46 also has the position shown in Figure 4 so that the protuberance 45 does not engage the same as the drive gear and collar are rotated. However, if the recycling actuator 46 is pivoted into the position shown in Figure 5, the protuberance 45 during rotation of the collar and drive gear, will engage the end of the recycling actuator and cause the recycling gear 43 to rotate a distance sufficient to mesh the teeth of the drive and recycling gears, whereupon the recycling gear is rotated through 360° and back to the position shown in Figure 4. Rotation of the recycling gear results in a complete recycling operation of the record player, during which the tone arm 16 is swung into the position shown in Figures 1 and 2, a record is dropped onto the turntable, and the tone arm moved into alignment with the periphery of the record tablet and lowered into engagement with the grooves thereof.

With the exception of a cam tongue 48 which is reciprocated axially during a recycling operation, the specific mechanisms that carry forth the various steps in the recycling operation when the gear 43 is rotated are not especially pertinent to this invention; and if a more detailed explanation is desired, reference may be made to my copending application identified hereinbefore. It may be noted, nevertheless, that a recycling operation can be initiated by moving the button 23 toward the tone arm assembly 15 since such movement reciprocates an elongated link 49 (Figure 2) which, through an additional linkage assembly 50, is effective to trip or move the recycling actuator 46 into the position shown in Figure 5. Movement of the control 23 toward the tone arm assembly also is effective to actuate a switch 51, whereby the reject button also comprises an on/off switch control.

The recycling actuator 46 may also be tripped automatically by movement of the tone arm 16 into adjacency with the spindle 12, which then defines the end of a record reproduction cycle; and the mechanism for accomplishing such result and also for preventing such result will now be described with particular reference to Figures 4 through 8, and it may be noted that it is within this mechanism that the instant invention resides.

It will be apparent from these figures that the actuator 46 may be tripped or moved into position for abutment with the protuberance 45 by a control or push rod 52 that is freely slidable through an enlarged opening 53 defined in a guide 54 rigidly secured to the platform 10. The rod 52 at its outer free end is turned downwardly, as shown at 55, so as to provide a more positive engagement with an upwardly turned flange 56 carried by the actuator 46. At its other end, the rod 52 is secured to a weight 57, that extends downwardly therefrom and is preferably rotatable with respect thereto. Adjacent the weight 57, the rod 52 extends through a vertically elongated opening 58 defined by a vertically extending ear 59 provided by a tone arm bracket 60 rigidly secured to a collar 61 affixed by a set screw 62 to a shaft 63 secured to the tone arm 16 so as to pivot therewith.

Disposed below the tone arm bracket 60 is a seat or friction bracket 64, rigidly secured to the platform 10 and therefore stationary. The bracket 64 is equipped with a laterally turned flange 65, disposed in a substantially horizontal plane, which has a seat member 66 extending upwardly therefrom which may be in the form of a cap screw so as to permit ready adjustment of the height thereof. The weight 57 is adapted to seat upon the member 66; and for that purpose, the bottom wall thereof is recessed as shown at 67 (see Figure 8). Preferably, the bracket 64 is provided with a stop 68 adjacent the seat member 66 adapted to abut the weight 57 and align the recess 67 thereof with the seat 66.

The tone arm 16, shaft 63 and tone arm bracket 60 are vertically movable with respect to the platform 10 and bracket 64, and vertical movement thereof is controlled by the cam tongue 48 which engages the lower end of the shaft 63. The cam tongue 48 is generally horizontal, but is equipped with a downwardly inclined end portion that is normally disposed beneath the shaft 63 when the recycling gear 43 is in the position shown in Figures 4, 5 and 6. However, when the recycling gear is rotated, the cam tongue 48 is shifted toward the right, whereupon the shaft 63 is driven upwardly along with the tone arm bracket 60 as well as the weight 57 and rod 52 because of the engagement of the rod with the lower extremity of the slot 58. The elevated position of the tone arm assembly is illustrated in Figure 8, and it is apparent that at this time the weight 57 is spaced above the seat 66. Slidable movement of the cam tongue 48 is effected upon rotation of the recycling gear 43 by means of an eccentric cam 69 carried by the recycling gear along the undersurface thereof, and which engages the inner end of the cam tongue.

It will be evident that in addition to raising the tone arm and tone arm bracket 60 during an automatic recycling operation, both of these elements must be rotated first from the rest position shown in Figures 1 and 2 into alignment with the periphery of a record supported by the platform; and second, after such record has been played, to return the assembly to the rest position. The mechanism for accomplishing this rotation is not illustrated and will not be described for it is not germane to the instant invention; and if a detailed disclosure thereof is desired, reference is directed to the aforementioned copending patent application.

In initiating operation of the apparatus, the holder 13 is swung to its lateral position and a stack of record tablets placed upon the upper magazine portion of the spindle 12. Thereafter, the holder 13 is returned to the position shown in Figure 1. Next, the tone arm 16 is freed from the interlock of the spring clip 18 with the post 17. If desired, the control button 22 may be shifted to the proper speed setting, but this step is unnecessary because proper speed selection for each record is determined through the sensing device 21, and linkage 33 through 36, etc., as heretofore explained. A reproduction cycle may now be commenced by moving the reject button 23 toward the tone arm assembly which, through the link 49, actuates the on/off switch 51.

This same movement of the reject button 23, through the linkage assembly 50, trips the recycling actuator 46, whereupon it is moved into the position shown in Figure 5 with the result that it is abutted by the protuberance 45 as the turntable 11 rotates. Such abutment moves the recycling gear 43 until the teeth thereof mesh with the drive gear 42. Rotation of the gear 43 causes a record to be dropped from the magazine and onto the turntable 11 because of the resultant movement of the cam 39, lever 38 and spindle ejector rod 37, all of which are shown in Figure 2. At the same time, the cam tongue 48 is moved from the position shown in Figure 5 to that illustrated in Figure 8 because of the engagement of the cam tongue with the eccentric 69 that rotates with the recycling gear 43. Consequently, the tone arm shaft 63, the tone arm bracket 60 carried thereby, and the tone arm 16 are all elevated.

It will be noted by referring to Figure 8 that as the tone arm bracket 60 is raised, the slot 58 in the ear 59 thereof initially moves upwardly with respect to the control rod 52 until the lower edge of the slot engages the control rod. At this time, the control rod and weight 57 are also elevated to a point at which the weight 57 clears the seat or rest 66. As the recycling gear 43 nears completion of a 360° rotation, the tone arm 16, shaft 63 and tone arm bracket 60 are all rotated in a clockwise direction, as viewed in Figure 1, until the tone arm is in alignment with the periphery of the record tablet that has been dropped onto the turntable. During this rotation of the tone arm, the cam tongue 48 is being shifted from the extended position thereof shown in Figure 8 to the normal position thereof illustrated in Figure 5, with the result that the tone arm assembly is lowered to bring the tone arm needle into playing engagement with the grooves of the record tablet. The relative position of the parts at this time is illustrated in Figure 4.

By comparing Figures 4 and 8, it will be noted that the described rotation of the tone arm bracket 60 has carried with it the control rod 52 and weight 57. The reason for this movement of the control rod is that it is being carried by the tone arm bracket 60 because of the frictional engagement between the lower end of the slot 58 and the control rod. As is well known, the tone arm 16 will be gradually moved toward the center of the record tablet and into adjacency with the spindle 12, as the record reproduction cycle nears completion. Thus, such continued pivotal movement of the tone arm 16 advances the control rod 52 toward the flange 56 of the recycling actuator 46 until abutment therebetween occurs substantially simultaneously with the termination of the record playing cycle.

This engagement between the control rod 52 and actuator 46, pushes the actuator into the path of the protuberance 45 (as shown in Figure 5) and a recycling operation is commenced. The recycling causes another record tablet to be dropped onto the turntable 11, after the cam tongue 48 has been shifted to the position shown in Figure 8 to elevate the tone arm assembly, and the tone arm assembly has been pivoted in a reverse direction and into the starting position shown in Figure 1. Thereafter, the tone arm is again pivoted into alignment with the periphery of the second record, and is then lowered so as to bring the needle thereof into engagement with the grooves in the record tablet.

It may be noted that during the entire recycling operation, the tone arm assembly remains elevated and the control rod 52 and weight 57 are moved therewith. This cyclic operation of the apparatus continues until the last record on the spindle has been played, and then the recycling operation terminates with the lowering of the tone arm assembly into the position shown in Figures 1 and 2, and the switch 51 is returned to its "off" position, all as is well known in the art.

The configuration of the parts during manual operation of the record player is shown in Figures 6 and 7, and it may be noted that essentially these same figures show the orientation of the parts when the apparatus is turned off. During manual play, the tone arm shaft 63 and bracket 60 remain lowered throughout the entire cycle of operation, with the result that the weight 57 is seated upon the rest 66. A firm engagement between the weight and rest is effected because of the recess 67 in the undersurface of the weight which nests the rest 66 therein. Further, there is no tendency for the tone arm bracket 60 to advance the control rod 52 and weight 57 toward the actuator 46 when the tone arm bracket is rotated, because the control rod is positioned intermediate the ends of the elongated slot 58 as seen in Figures 6 and 7, whereby substantially free relative movement between the bracket and control rod is afforded.

Whenever the record player is operating under manual control, a record reproduction cycle is initiated by manually lifting the tone arm 16 from the support 17, pivoting it into alignment with a record periphery, and then lowering the tone arm to engage the needle thereof with the record grooves. This step is illustrated in Figure 6, and it is clear from that illustration that the weight 57 remains seated on the rest 66. At the completion of the record reproduction cycle, the tone arm 16 is of course adjacent the spindle 12, and the tone arm bracket 60 will have moved farther from the stationary bracket 65 and into the relative position therebetween shown in Figure 7. The weight 57 and control rod 52, however, remain substantially stationary during such movement of the tone arm and bracket 60 thereof. Consequently, the tone arm 16 will idle at the center of the record until it is manually lifted and replaced on the support 17 therefor. The reason for this is evident since a recycling operation can only be initiated automatically by the movement of the control rod 52 into engagement with the recycling actuator 46. Therefore, when the apparatus is under manual control, it will remain in that condition until the reject button 23 is actuated, whereupon automatic recycling is commenced because of the resulting elevation of the tone arm bracket 60 to free the weight 57 from the seat member 66.

Conversely, the apparatus will remain under automatic control unit the tone arm 16 is manually moved into the rest position shown in Figure 1 during some time in the automatic operational cycle when the tone arm bracket 60 is in its lowered position. Essentially then, the only limitation on changing from automatic to manual operation is that such change cannot be made during the time the tone arm is being automatically returned from a position adjacent the spindle and into alignment with the periphery of a subsequent record tablet, for during this entire movement the tone arm bracket 60 is elevated. At all other times, the apparatus may be converted to manual control simply by swinging the tone arm into the rest position of Figure 1, for such pivotal movement in a counter-clockwise direction will seat the weight 57 on the rest member 66 and, as heretofore described, automatic operation cannot be commenced so long as that position of the weight is maintained.

It will be apparent that whenever the tone arm, and consequently the tone arm bracket 60, are pivoted in a counter-clockwise direction as viewed in Figures 4 through 6, the control rod 52 and weight 57 will always be moved therewith because the vertical ear 59 of the tone arm bracket will abut the weight and thereby cause it to move therewith. Thus, each time the tone arm bracket is pivoted in the counter-clockwise direction, sufficiently far so as to bring the tone arm 16 into alignment with the rest 17 thereof, the weight 57 will be aligned over the rest member 66. Therefore, if such movement occurs when the tone arm bracket 60 is in its lowered position, the weight 57 will be moved onto the rest 66, and will seat the same within the recess 67 thereof. If the seat or rest member 66 is a cap screw as shown in the drawings, it is readily adjusted to the position that affords the greatest anchorage for the weight 57, while at the same time and commensurate therewith offers the least resistance to the movement of the weight thereonto.

A modified form of seat or rest member is shown by dotted lines in Figure 7, and is denoted with the numeral 70. The member 70 is in the form of an inclined stop or lip that extends upwardly from the flange 65 of the stationary bracket 64, and is adapted to cam the weight 57 upwardly to clear it when moved to its resting position and to constrain the weight 57 therebehind when the tone arm is lifted manually. It will be apparent that if the lip 70 is employed, the screw seat 66 may be omitted. The function of the apparatus will still be the same, however, for the weight will be constrained behind the lip 70 unless lifted upwardly therefrom by the tone arm bracket 60 during automatic operation as hereinbefore described.

It will be evident that the phonograph or record player described is exceedingly simple to operate, and requires but a single manually mainipulatable control button—namely, a combination on/off—reject button. The only operator attention required to initiate a record reproduction cycle is to push the control button 23 through the "on" position and to the "reject" position, and thereafter the record player will operate automatically to play an entire stack of records supported on the spindle 12. If manual operation is desired, the control button 23 simply may be pushed to the "on" position, and the tone arm 16 manually placed on a record tablet to reproduce the same, and manually lifted from such tablet at the termination of the reproduction cycle. Whenever it is desired to change the apparatus from automatic to manual control, it is only necessary to manually lift the tone arm 16 and return it to the rest position shown in Figure 1, for such movement automatically places the apparatus under the manual control of an operator. To change from manual to automatic control, it is only necessary to push the control button 23 into the reject position. Thus, not only is operation easily effected, but the record player is mechanically simplified with the result that the cost thereof is decreased.

While in the foregoing specification embodiments of the invention have been described in considerable detail for purposes of making an adequate disclosure thereof, it will be apparent to those skilled in the art that numerous changes may be made in those details without departing from the principles and spirit of the invention.

I claim:

1. In a record player having a recycling mechanism for automatically and manually playing a plurality of record tablets sequentially, a recycling actuator movable from a resting position into a position for initiating a recycling operation, a tone arm assembly having a tone arm pivotally mounted for horizontal movement and an element movable vertically from a resting position for raising and lowering the tone arm, means actuated by said actuator for moving said element vertically and said tone arm horizontally during an automatic recycling operation, a control member engaged by said element when said element is raised and movable by said element horizontally to move said actuator into its recycle initiating position, and means engaged by said control member during horizontal movement of the tone arm in its raised position for supporting said control member out of relative engagement with said element when said element is in its resting position.

2. In a record player having a recycling mechanism for automatically and manually playing a plurality of record tablets sequentially, a recycling actuator movable into a position for initiating a recycling operation but normally being remote therefrom, a tone arm assembly movable vertically and horizontally from a resting position to a playing position, a control member for operating said recycling actuator, means carried by the tone arm assembly and frictionally engaging said control member when said tone arm is moved vertically from said resting position for moving the control member into engagement with said actuator during subsequent horizontal playing movement of the tone arm assembly, and means for supporting said control member out of engagement with the means carried by the tone arm assembly when said tone arm assembly is moved by hand horizontally from its resting position to its playing position.

3. In a record player having a recycling mechanism for automatically and manually playing a plurality of record tablets sequentially, a recycling actuator movable from a resting position into a position for initiating a recycling operation, a tone arm assembly having a tone arm pivotally mounted for horizontal movement and an element movable vertically from a resting position for raising and lowering the tone arm, means actuated by said actuator for moving said element vertically and said tone arm horizontally during an automatic recycling operation, a control member frictionally engaged by said element when said element is raised and slidably carried by said element for progressive displacement thereon during the playing of a record, said control member being movable by rapid movement of said element horizontally to actuate said actuator into its recycle initiating position, engaged by said control member means for holding said control member against movement beyond its resting position when said element and tone arm are returned horizontally from a playing position in a raised position and means engaged by said control member during said horizontal return of the tone arm in its raised position for supporting said control member out of relative engagement with said element when said element is in its resting position.

4. In a record player having a recycling mechanism for automatically and manually playing a plurality of record tablets sequentially, a recycling actuator movable into a position for initiating a recycling operation but normally being remote therefrom, a vertically movable and horizontally pivotal tone arm assembly including a tone arm and a tone arm bracket carrying a vertically movable support element, a control member having a portion thereof extending above said support element and equipped with a part for urging said control member into engagement with said support element, said control member being aligned with said actuator and movable to engage the same for moving the actuator into the recycle initiating position thereof, a seat adapted to support said part and hold the member out of engagement with said support element, and means actuated by said actuator for elevating said support element during an automatic recycling operation to engage said control member and move said part from said seat and advance said control arm into engagement with said actuator with the playing of a record.

5. In a record player having a recycling mechanism for automatically changing a plurality of record tablets for the successive reproduction thereof, a recycling actuator movable into a position for initiating a recycling operation but normally being remote therefrom, a tone arm shaft supported for pivotal and vertical movement, a tone arm bracket fixed to said shaft for movement therewith, an ear secured to said bracket and extending upwardly therefrom and having a vertically elongated slot therein, a fixed seat disposed below said slot and spaced laterally therefrom, a weight, a control rod secured to said weight and extending therefrom through said slot and into adjacency with said actuator, and means for elevating said tone arm bracket to lift said weight from said seat by engagement of the lower edge of said slot with said control rod, whereby pivotal movement of said tone arm bracket in one direction advances said control rod into engagement with said actuator to move the same into the recycle initiating position thereof, said seat being oriented with respect to said slot so that said control rod is disposed intermediate the ends thereof when said weight is resting upon said seat whereby said tone arm bracket may be pivoted in the aforesaid one direction without moving said control rod.

6. The apparatus of claim 5 in which said tone arm shaft projects downwardly through said bracket, and in which said means for elevating said bracket comprises a cam tongue engageable with the lower end of said shaft to cam the same upwardly during an automatic recycling operation.

7. The apparatus of claim 6 in which said seat is vertically adjustable.

8. In record player apparatus of the character described having a platform rotatably carrying a motor driven turntable, a tone arm for reproducing records disposed on said turntable and a recycling mechanism for automatically changing a plurality of record tablets for the successive reproduction thereof, a shaft secured to said tone arm and extending downwardly therefrom through said platform and being supported thereby for both vertical and pivotal movement, a tone arm bracket affixed to said shaft below said platform and being provided with an edge portion disposed in a generally horizontal plane, a control rod extending over said edge and being equipped adjacent thereto with a depending weight, a fixed bracket carried by said platform therebelow, a seat carried by said fixed bracket and being adapted to receive said weight thereon, said seat being oriented with respect to said edge so that said control rod is spaced thereabove when the weight is positioned on said seat, and means operatively associated with said recycling mechanism for elevating said tone arm bracket during an automatic recycling operation to an extent that said edge engages said control rod and raises the same to lift said weight from said seat to establish a drive relationship urged by said weight between the control rod and bracket whereupon said control rod is advanced longitudinally upon horizontal pivotal movement of said tone arm bracket, said control rod being operative by such movement thereof to initiate an automatic recycling sequence.

9. The apparatus of claim 8 in which said tone arm bracket is equipped with a vertically extending ear having a vertically elongated slot therein, and in which said slot defines the aforesaid edge and passes said control rod therethrough.

10. The apparatus of claim 9 in which a recycling actuator is positioned adjacent the end of said control rod remote from said weight and is adapted to be engaged thereby when said control rod is so moved longitudinally, said actuator being operative when engaged by said control rod to initiate a recycling operation by the mechanism therefor.

11. In a record player operative selectively to play successive records manually or automatically, a platform, a turntable rotatably supported by said platform and being adapted to receive records thereon, motor means for rotating said turntable, a tone arm pivotally movable from a rest position laterally of said turntable to a position in general alignment with the periphery of a record on said turntable for initiating the reproduction thereof and then to a position adjacent the center of said turntable as determined by completion of such reproduction cycle, and a recycling mechanism comprising a drive gear rotated by said turntable and having a protuberance extending outwardly therefrom, a relatively large recycling gear adapted to be drivingly engaged throughout substantially the entire periphery thereof by said drive gear but having a recessed peripheral area discontinuing such driving engagement when adjacent said drive gear, a recycling actuator pivotally mounted on said recycling gear and having a leg thereof normally positioned adjacent but inwardly of said recessed area and being movable outwardly therefrom and into the path of said protuberance to effect rotation of said recycling gear to the extent necessary to reestablish driving engagement between said drive and recycling gears, an elongated control rod supported for longitudinal movement to push an end thereof against said recycling actuator to so move the same into the path of the protuberance, a weight carried by said control rod adjacent the opposite end thereof, a tone arm bracket carried by said tone arm for vertical and pivotal movement therewith and having an ear extending upwardly therefrom provided with a vertically elongated slot therein passing said control rod therethrough, a fixed bracket secured to said platform and having a portion thereof disposed generally below said tone arm bracket for receiving and supporting said weight thereon, and an elongated cam tongue coupled with said recycling gear and being disposed in camming relation with said tone arm bracket for elevating the same during a recycling operation, said slot being dimensioned so that said rod is freely movable with respect thereto when said tone arm bracket is in its lowered position and said weight is supported by said fixed bracket but so that when said tone arm bracket is raised, the lowermost edge of said slot frictionally engages said control rod to elevate the same and thereby lift said weight free of said fixed bracket and impose the weight upon the frictional engagement, whereby when said tone arm bracket is then horizontally pivoted by the tone arm during the reproduction thereby of a record, the frictional engagement between said rod and slot advances the rod into engagement with said recycling actuator to move the same into the path of said protuberance for initiation of an automatic recycling operation at the termination of a record reproduction cycle.

12. In a record player having a recycling mechanism for automatically changing a plurality of record tablets for the successive reproduction thereof, a recycling actuator movable into a position for initiating a recycling operation but normally being remote therefrom, a vertically movable and horizontally pivotal tone arm assembly including a tone arm and a tone arm bracket movable therewith, said bracket defining a vertically elongated opening therein, a control rod having an end portion thereof extending through said opening and equipped with a weight for urging said control rod into frictional engagement with said bracket, the other end of said control rod being aligned with said actuator and adapted to engage the same for moving the actuator into the recycle initiating position thereof when moved by said bracket, a fixed seat adapted to receive said weight thereon, and means for elevating said tone arm bracket during an automatic recycling operation to lift said weight from said seat to frictionally engage said control rod and thereafter advance said control rod into engagement with said actuator, said opening having a vertical dimension substantially greater than that of said rod and said seat being oriented with respect to said opening so that said rod is intermediate the ends of the opening when said weight is resting on said seat.

References Cited in the file of this patent

UNITED STATES PATENTS

| | | |
|---|---|---|
| 2,094,255 | Carson | Sept. 28, 1937 |
| 2,286,490 | Knox | June 16, 1942 |
| 2,558,060 | Rudolph | June 26, 1951 |
| 2,597,113 | Lingenbrink | May 30, 1952 |
| 2,645,496 | Baxter | July 14, 1953 |

FOREIGN PATENTS

| | | |
|---|---|---|
| 562,650 | Great Britain | July 11, 1944 |